(12) United States Patent
Logan

(10) Patent No.: US 6,349,773 B1
(45) Date of Patent: Feb. 26, 2002

(54) PLASTICS HORSESHOE

(75) Inventor: Ernest Fergus Logan, Co. Antrim (GB)

(73) Assignee: Giltspur Scientific Limited, Ballyclare (GB)

( * ) Notice: Subject to any disclaimer, the term of this patent is extended or adjusted under 35 U.S.C. 154(b) by 0 days.

(21) Appl. No.: 09/486,768
(22) PCT Filed: Sep. 14, 1998
(86) PCT No.: PCT/GB98/02778
§ 371 Date: Mar. 2, 2000
§ 102(e) Date: Mar. 2, 2000
(87) PCT Pub. No.: WO99/15006
PCT Pub. Date: Apr. 1, 1999

(30) Foreign Application Priority Data

Sep. 25, 1997 (GB) .............................. 9720462

(51) Int. Cl.[7] .............................. A01L 5/00; B21K 15/02
(52) U.S. Cl. ................. 168/24; 168/DIG. 1; 59/61; 428/371
(58) Field of Search .................. 168/4, 24, DIG. 1; 59/61; 428/371; 267/167; 264/177.1, 555; 425/381.2

(56) References Cited

U.S. PATENT DOCUMENTS 4,751,123 A * 6/1988 Broquere et al. ....... 428/371 X
4,892,150 A * 1/1990 Thoman .................. 168/4

FOREIGN PATENT DOCUMENTS

DE    4005388    *  8/1991  ............... 168/4

* cited by examiner

Primary Examiner—Robert P. Swiatek
(74) Attorney, Agent, or Firm—Andrus, Sceales, Starke & Sawall LLP

(57) ABSTRACT

A stock from which circumferential lengths can be cut to be used as horseshoes, the stock comprising a helical coil of plastics materials wound about an axis such that the cross section of the coil in a plane containing the axis is constant in shape for any such plane and substantially corresponds to the cross section of a horseshoe in the same plane.

10 Claims, 1 Drawing Sheet

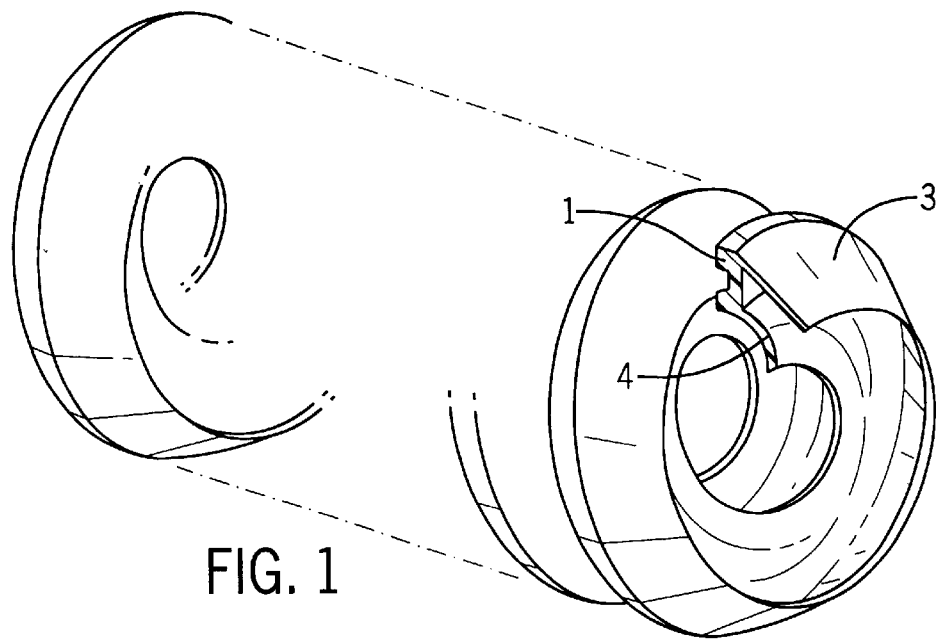
FIG. 1
FIG. 2
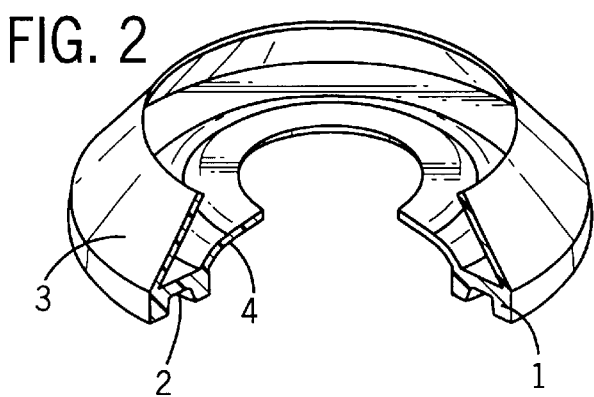
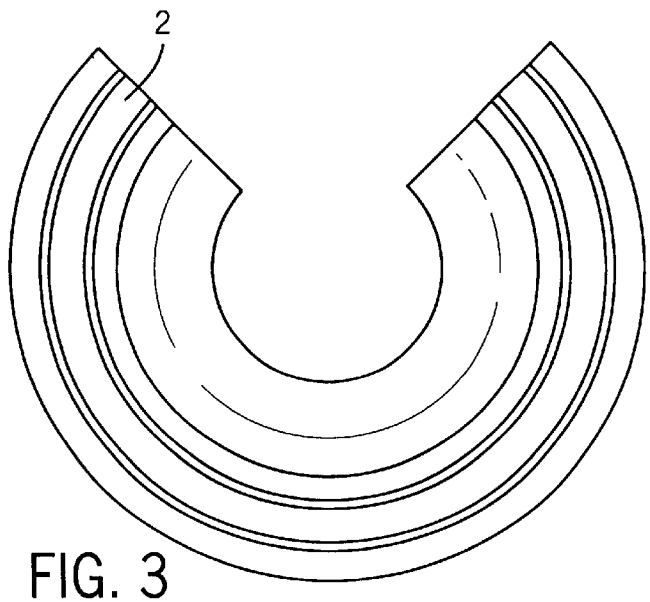
FIG. 3

PLASTICS HORSESHOE

BACKGROUND OF THE INVENTION

The present invention relates to a plastics horseshoe. A plastics horseshoe offers advantages over a conventional metal horseshoe in that it is lighter in weight, and can be more easily fitted to a horse's hoof as the plastics material is readily formed into the correct shape. Plastics horseshoes can be glued to a hoof, so that they do not require a farrier to fit them, and can avoid damage to hooves caused by nails.

However, unlike a metal horseshoe, a plastics horseshoe cannot readily be manipulated to fit a wide variety of hoof sizes. It is therefore necessary to produce a plastics horseshoe in a range of sizes, or to provide some means by which the size may be readily adapted. One such plastics horseshoe currently on the market requires the horses hoof to be placed on a pad and traced so that the pad can then be cut to the appropriate size. Individual tabs are then welded at intervals around the base. Each tab is then glued to the horse's hoof in order to retain the horseshoe in place. It is time consuming to fit such a shoe, wasteful of material, and requires a number of parts to be supplied for each shoe.

SUMMARY OF THE INVENTION

The present invention aims to provide a way in which a plastics horseshoe can be fitted to a whole range of hoof sizes which is simple in construction and which is easy to fit.

According to the present invention a stock from which circumferential lengths can be cut to be used as horseshoes comprises a helical coil of plastics material wound about an axis such that the cross section of the coil in a plane containing the axis is constant in shape for any such plane and substantially corresponds to the cross section of a horseshoe in the same plane.

Such a stock is supplied to an end user who can then cut off a portion of the helix, the circumferential length of which depends upon the size of the hoof of the horse to be shod. The horseshoe can then be fitted to the exact shape of the hoof by manipulating the plastics material in a number of simple ways which may be used individually or in combination. If the plastics material is resilient, and the internal radius of the portion cut from the helix is less than the external radius of the hoof, the two ends of the horseshoe can be pulled apart against the resilience of the material so that the horseshoe can be fitted onto a hoof. Once the horseshoe is placed over the hoof, the horseshoe can be released and the resilience of the material will ensure that the shoe grips the hoof. Secondly, the horseshoe may be of a material which is readily plastically deformable, so that it can be plastically deformed to fit the shape of the hoof. The plastics material may be such that the horseshoe requires heating, for example in hot water or using a blow-torch, before it can be adequately plastically deformed.

The shoe may be attached to the horse's hoof using an adhesive. In this way, damage done to the hoof by nailing the shoe in place can be avoided. However, if it is necessary to nail the shoe in place, then this can be done. A cement can be introduced into the shoe before it is placed on the hoof, so that the pressure of the hoof within the shoe will push the cement into any gaps between the shoe and the hoof thereby ensuring a tight fit.

It is believed that only three different diameters of stock would need to be produced in order to shoe the entire range of horse sizes from Shetland ponies to shire horses. This represents a considerable saving in mould costs over other plastics shoes.

When the horseshoe is cut from the helical stock, the part of the horseshoe to be attached to the sole of the hoof will be skewed from a planar state, and will have to be twisted into a planar state so that it can be attached to the underside of the hoof. Again, the plastics material can be elastically deformable and the stock formed so as to be pre-tensioned so that the horseshoe automatically reverts to a planar state when it is out from the stock, or it can be plastically deformable so that it can be bent into this planar state. Alternatively, the memory of the plastics material may be such that, upon heating, the sole twists into the planar state.

In the simplest form, the stock is configured such that the horseshoes cut from it are simply a base having a flat cross section which can be fastened to the underside of the hoof. However, more sophisticated shapes can be formed, so that, for example, an outer wall extends upwardly and radially inwardly from the radially outermost edge of the base portion. Such an outer wall will, in use, cover the lower part of the hoof and will facilitate the fixing of the shoe if it is to be adhered to the hoof. If this wall is continuous, it allows a farrier greater freedom for the placement of nails than a shoe having discrete tabs, so that weak areas of the hoof can be avoided. Also, parts of the continuous wall can be removed to prevent weight bearing on and to allow air to get to damaged or infected parts of a hoof without unduly weakening the shoe.

The outer wall may be such that its cross section increases away from the base. The thinner lowermost portion of this wall means that the wall can be more readily manipulated into the correct position, while the thicker upper portion of the wall is such that it is more difficult to peel away from the hoof once the shoe is glued in place.

An inner wall may extend radially upwardly and inwardly from the radially innermost edge of the base to protect the softer innermost part of the hoof.

The invention also extends to a method of manufacturing a stock from which circumferential lengths can be cut to be used as horseshoes, the method comprising extruding a plastics material into a helical coil wound about an axis such that the cross section of the coil in a plane containing the axis is constant in shape for any such plane and substantially corresponds to the cross section of a horseshoe in the same plane.

Extruding the stock provides a simple method of producing the helical structure as it allows complex cross sections to be manufactured. In order to produce the curved structure of the helix from an extruding die, it is preferable to ensure that the flow path length within the die of the portion which is to form the radially outermost part of the helix is shorter than the flow path within the die for the portion of the die which is to form the radially innermost part of the helix. This ensures that the flow at the radially outermost part is faster than the flow of the radially innermost part thereby creating the curved structure.

The plastics material is preferably a polymer or copolymer such as PVC or polyurethane.

BRIEF DESCRIPTION OF THE SEVERAL VIEWS OF THE DRAWINGS

An example of a stock and method constructed in accordance with the present invention will now be described with reference to the accompanying drawings, in which:

FIG. 1 is a perspective view of the stock;

FIG. 2 is a perspective view of a horseshoe cut from the stock; and

FIG. 3 is an underneath plan of the horseshoe.

DETAILED DESCRIPTION OF THE INVENTION

As shown in FIG. 1 the stock is extruded with the appropriate cross section into a helical coil, and is supplied in this form to the end user.

The end user cuts off an appropriate circumferential length depending upon the size of the hoof of the horse to be shod. The cut off portion is manipulated from the slightly twisted form in which it is part of the coil to the untwisted form having a flat base as shown in FIG. 2. In this form the horse shoe can be applied to the horse's hoof. The plastics material may be further manipulated in order to fit the shoe correctly on the hoof. Gaps between the hoof and the shoe can be filled with cement.

The external diameter of the helical coil is less than the external diameter of the average shoe for the type or breed of horse. When the shoe is fitted to an average size hoof, the ends of the shoe have to be pulled apart to enlarge the shoe so that it can be fitted onto the hoof. The resilience of the plastics material then ensures that the shoe tightly grips the hoof. On the other hand, if a smaller than average hoof is to be shod, the circumferential length of material cut from the stock is shorter and requires plastic deformation in order to fit snugly around the hoof. For a larger than average hoof a longer circumferential length is cut from the stock, and the shoe may need to be heated and stretched plastically. The illustrated profile has a base 1 with a fullering 2. An outer wall 3 extends upwardly and inwardly from the radially outermost edge of the base and provides some protection for the lower part of the hoof. In addition, this wall 3 provides a large surface area between the shoe and the hoof so that the shoe can be readily attached using an adhesive. Furthermore, this large surface area allows the farrier to remove certain areas of the shoe in order to expose any damage or infection of the hoof so as to allow it to heal more quickly. An inner wall 4 projects upwardly and radially inwardly from the innermost edge of the base 1 to provide protection for the softer underside of the hoof.

What is claimed is:

1. A stock from which circumferential lengths can be cut to be used as horseshoes, the stock comprising a helical coil of plastics material wound about an axis such that the cross section of the coil in a plane lying parallel to and containing the axis is constant in shape for any such plane and substantially corresponds to the cross section of a horseshoe in a plane transverse to the circumferential length of stock forming the horseshoe, the helically coiled stock being configured such that horseshoes cut from it comprise a base portion (1) having a flat surface which can be fastened to the underside of the hoof, and an outer wall (3) extending upwardly and radially inwardly from a radially outermost edge of the base portion.

2. A stock according to claim 1, wherein the plastics material is resilient.

3. A stock according to claim 1, wherein the plastics material is readily plastically deformable, so that it can be plastically deformed to fit the shape of a hoof.

4. A stock according to claim 1, wherein the plastics materials is elastically deformable and the stock is formed so as to be pre-tensioned so that the horseshoe automatically reverts to a planar state when it is cut out from the stock.

5. A stock according to claim 1, wherein the memory of the plastics material is such that, upon heating, the base portion twists into a planar state.

6. A stock according to claim 1, wherein the outer wall (3) is continuous.

7. A stock according to claim 1, further comprising an inner wall (4) extending radially upwardly and inwardly from the radially innermost edge of the base portion (1).

8. A method of shoeing a horse, the method comprising the steps of cutting the horseshoe of the appropriate length from a stock according to claims 1, 2, 3, 4, 5, 6, or 7, introducing a cement into the horseshoe, and pressing the shoe onto a hoof, so that the pressure of the hoof within the shoe will push the cement into any gaps between the shoe and hoof thereby ensuring a tight fit.

9. A method of manufacturing a stock from which circumferential lengths can be cut to be used as horseshoes, the method comprising extruding a plastics material into a helical coil wound about an axis such that the cross section of the coil in a plane lying parallel to and containing the axis is constant in shape for any such plane and substantially corresponds to the cross section of a horseshoe in a plane transverse to the circumferential length of stock forming the horseshoe.

10. A method according to claim 9, wherein the plastics material is extruded from an extruding die in which the flow path length within the die of the portion which is to form the radially outermost part of the helix is shorter than the flow path within the die for the portion of the die which is to form the radially innermost part of the helix.

* * * * *